UNITED STATES PATENT OFFICE.

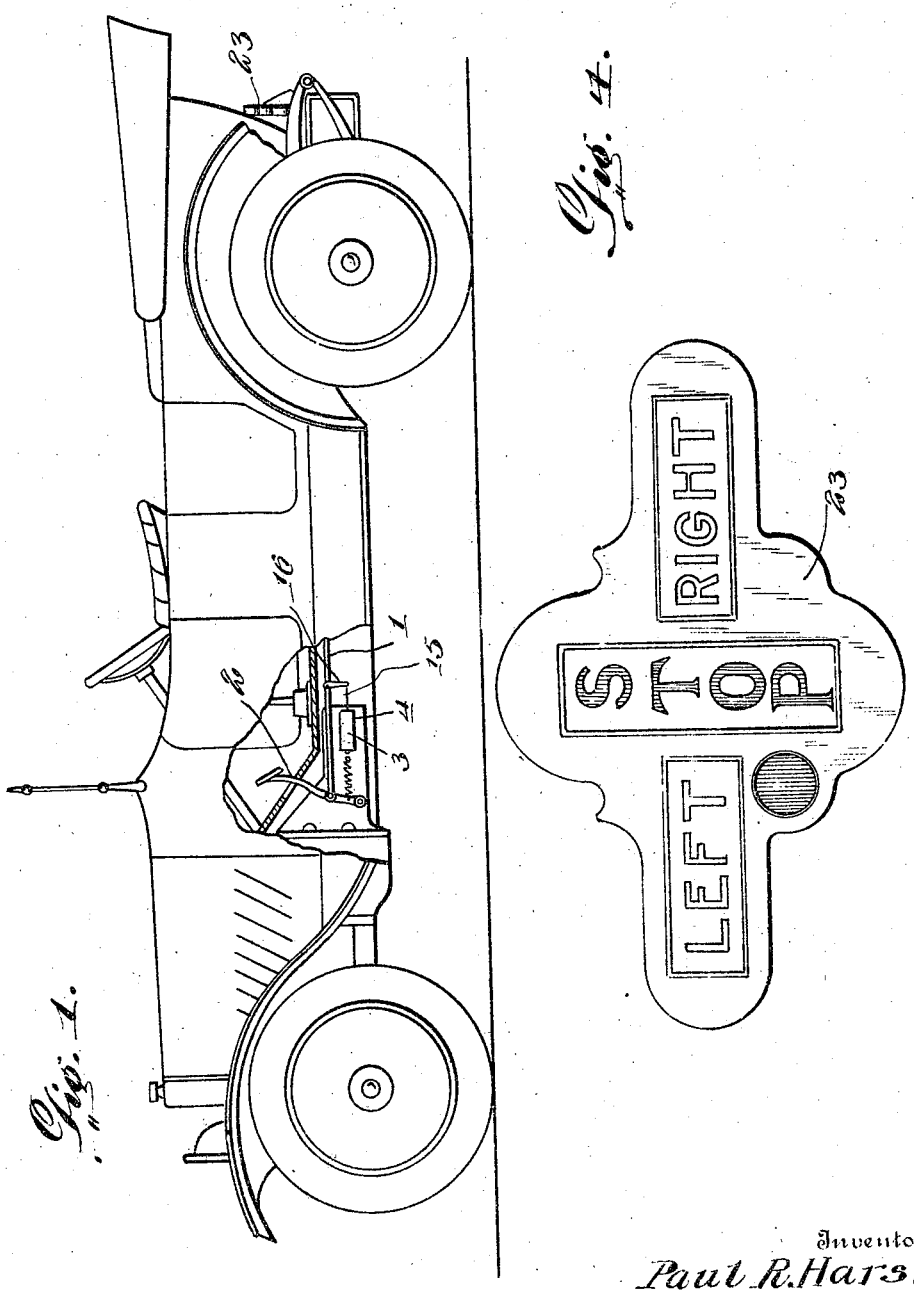

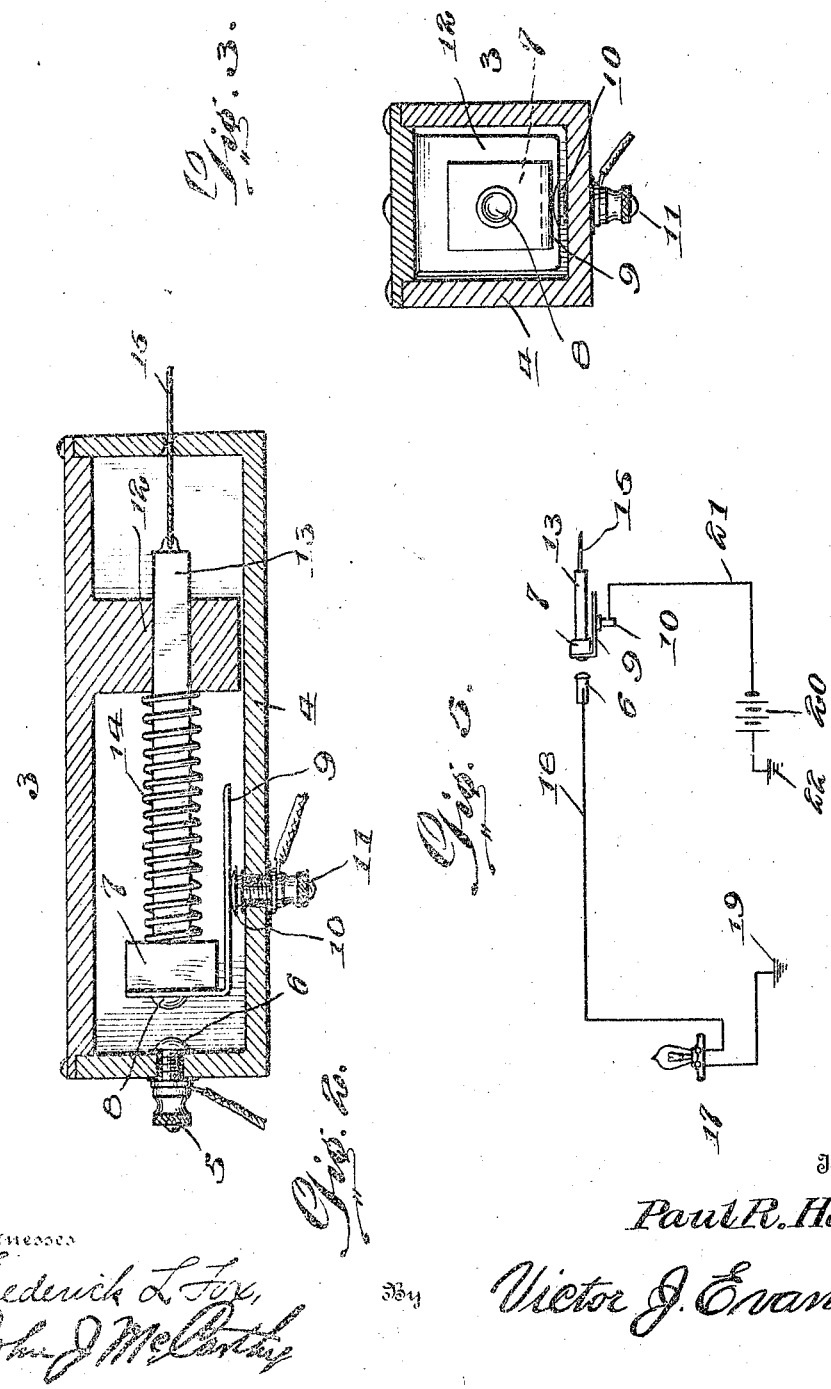

PAUL R. HARSH, OF TOLEDO, OHIO.

SIGNAL APPARATUS FOR MOTOR-VEHICLES.

1,215,272. Specification of Letters Patent. Patented Feb. 6, 1917.

Application filed December 30, 1915. Serial No. 69,450.

*To all whom it may concern:*

Be it known that I, PAUL R. HARSH, a citizen of the United States, residing at Toledo, in the county of Lucas and State of Ohio, have invented new and useful Improvements in Signal Apparatus for Motor-Vehicles, of which the following is a specification.

This invention relates to improvements in signal apparatus for motor vehicles and has particular application to a stop signal under the control of the brake lever of the vehicle.

In carrying out the present invention, it is my purpose to provide a stop signal for motor vehicles which will be automatically illuminated when the brake lever is operated to apply the brakes so that the operators of vehicles behind the signal equipped vehicle will be enabled to check the speed of their vehicles so as to prevent colliding with the vehicle carrying the signal.

It is also my purpose to provide signal apparatus of the class described which will embrace the desired features of simplicity, efficiency and durability, which may be installed and maintained at comparatively small cost, and which may be applied to the vehicle without necessitating any change in the structure of the vehicle.

With the above and other objects in view, the invention consists in the construction, combination and arrangement of parts hereinafter set forth in and falling within the scope of the claims.

In the accompanying drawings;

Figure 1 is a fragmentary longitudinal sectional view through a motor vehicle equipped with signal apparatus constructed in accordance with the present invention.

Fig. 2 is an enlarged longitudinal sectional view through the circuit closer.

Fig. 3 is a cross sectional view therethrough.

Fig. 4 is a view in elevation showing one form of signal lamp.

Fig. 5 is a diagrammatic view showing the circuit connections between the lamp and the circuit closer.

Referring now to the drawings in detail, 1 designates the brake rod of a motor vehicle, such rod forming a connection between the brake lever 2 and the brake bands. Arranged in juxtaposition to the brake rod 1 is a circuit closer 3 embodying a substantially rectangular casing 4 lying parallel with the brake rod. Secured in one end of the casing 4 is a binding post 5 and fastened to the inner end of the binding post 5 is a contact stud 6, while slidably mounted within the casing 4 is a plunger 7 having one side provided with a contact stud 8 adapted to engage the stud 6. Secured to one side of the plunger 7 is a conducting strip 9 electrically connected with the stud 8 and adapted to wipe over the contact plate 10 secured to the adjacent wall of the casing 4 and secured in such wall of the casing 4 is a binding post 11 electrically connected to the contact plate 10. Mounted in the casing 4 adjacent to the end thereof opposite from the plunger 7 is a guide block 12, while secured to the plunger 7 and projecting through the guide block 12 is a rod 13. Encircling the rod 13 between the plunger 7 and the guide block 12 is a coiled expansion spring 14 acting to force the plunger 7 toward the stud 6 so as to engage the stud 8 with the stud 6. Connected to the end of the plunger rod 13 projecting through the guide block 12 is one end of a wire 15 or other flexible element and the other end of such flexible element is connected with one extremity of an arm 16 secured to the brake rod 1. The rod 16 is preferably adjustably connected to the brake rod 1 as shown in the drawings so that the position of the arm on the rod may be changed.

17 designates a signal lamp arranged upon the rear end of the vehicle and one side of the lamp 17 is connected with the binding post 5 by means of a conductor 18, while the other side of the lamp is grounded upon the frame of the vehicle as at 19. 20 designates a suitable source of electrical energy such, for instance, as a battery and one side of the battery is connected to the binding post 11 by means of a conductor 21, while the other side of the battery is grounded upon the frame of the vehicle as at 22.

In practice, the spring acting upon the brake lever to hold the brakes in released position counteracts the spring 14 so that the wire 15 and arm 16 will hold the plunger 7 in retracted position and the studs 6 and 8 out of engagement with each other. When, however, the brake lever is operated to apply the brakes, the arm 16 is moved to release the wire 15 and the plunger 7 and the spring 14 reacts to slide the plunger to engage the contact stud 8 with the stud 6, thereby closing the circuit of the lamp 17, current flowing from one side of the battery 20, through the conductor 21, the binding post 11, the contact plate 10, conductor strip 9, stud 8, stud 6, binding post 5, conductor 18, the lamp and then back to the other side of the battery by way of the grounded terminals of the lamp and battery.

In the present instance, I have shown the lamp 17 as arranged in the vertical compartment of a casing 23 and the outer wall of this vertical compartment is formed with the letters constituting the word "Stop" and these letters may be colored red so that when the lamp is illuminated the signal will be conspicuously displayed. This casing 23 is formed at the left and right respectively of the vertical compartment with horizontal compartments and the outer walls of these compartments are cut out to provide letters constituting the words "Left" and "Right" and in each of these horizontal compartments is a lamp. These lamps may be controlled in any suitable manner so that the driver of the signal equipped vehicle may notify the drivers of other vehicles when he is about to turn to the left or right.

While I have herein shown and described the preferred form of my invention by way of illustration, I wish it to be understood that I do not limit or confine myself to the precise details of construction herein described and delineated, as modification and variation may be made within the scope of the claim and without departing from the spirit of the invention.

I claim:

A circuit closer comprising a casing, a stud carried by one end of said casing, a plunger in said casing capable of sliding movement therein, a stud on said plunger adapted to engage the first-named stud, a binding post secured to one side of said casing, a conductor strip secured to said plunger and connected to the stud thereon and designed to wipe over said binding post in the movement of the plunger, a guide block in said casing, a rod connected to said plunger and projecting through said guide block, a spring surrounding said rod between said plunger and guide block and acting to slide said plunger to engage said studs with each other, and a cord connected to said rod and projecting through one end wall of the casing and acting to hold the plunger against movement under the action of said spring.

In testimony whereof I affix my signature in presence of two witnesses.

PAUL R. HARSH.

Witness:
BENNETT S. JONES.